(12) United States Patent
Walter

(10) Patent No.: US 9,316,557 B2
(45) Date of Patent: Apr. 19, 2016

(54) METHOD FOR SELF-MONITORING A CERAMIC PRESSURE MEASURING CELL OF A CAPACITIVE PRESSURE SENSOR AND EVALUATION CIRCUIT FOR CARRYING OUT SAID METHOD

(75) Inventor: Heinz Walter, Hergatz (DE)

(73) Assignee: IFM ELECTRONIC GMBH (DE)

( * ) Notice: Subject to any disclaimer, the term of this patent is extended or adjusted under 35 U.S.C. 154(b) by 297 days.

(21) Appl. No.: 13/883,851

(22) PCT Filed: Dec. 7, 2011

(86) PCT No.: PCT/EP2011/072119
§ 371 (c)(1),
(2), (4) Date: Jun. 11, 2013

(87) PCT Pub. No.: WO2012/076615
PCT Pub. Date: Jun. 14, 2012

(65) Prior Publication Data
US 2013/0269412 A1 Oct. 17, 2013

(30) Foreign Application Priority Data

Dec. 8, 2010 (DE) .......................... 10 2010 062 622

(51) Int. Cl.
*G01L 25/00* (2006.01)
*G01L 9/00* (2006.01)
(Continued)

(52) U.S. Cl.
CPC .................. *G01L 25/00* (2013.01); *G01L 9/003* (2013.01); *G01L 9/12* (2013.01); *G01L 27/007* (2013.01)

(58) Field of Classification Search
CPC ....... G01L 9/12; G01L 9/0072; G01L 27/007; G01L 9/0075; G01L 25/00; G01L 9/003

USPC .......... 73/1.57–1.69, 708, 718, 724; 361/283; 374/143; 702/98
See application file for complete search history.

(56) References Cited

U.S. PATENT DOCUMENTS 5,097,712 A * 3/1992 Gerst et al. ...................... 73/708
5,611,623 A * 3/1997 Lawson ......................... 374/170
(Continued)

FOREIGN PATENT DOCUMENTS

| CA | 2101068 | 5/1993 |
|----|---------|--------|
| DE | 198 51 506 C1 | 10/2000 |

(Continued)

OTHER PUBLICATIONS

International Search Report; PCT/EP2011/072119; Int'l File Date: Dec. 7, 2011; IFM Electronic GmbH, 2 pgs.

*Primary Examiner* — Hezron E Williams
*Assistant Examiner* — Gedeon M Kidanu
(74) *Attorney, Agent, or Firm* — Schmeiser, Olsen & Watts, LLP

(57) ABSTRACT

A method for monitoring the operation of a pressure measuring cell (10) of a capacitive pressure sensor (1), wherein the pressure measuring cell (10) has a measuring capacitor ($C_M$) and a reference capacitor ($C_R$) and the pressure measuring value (p) is obtained from the capacity values of the measuring capacitor ($C_M$) and the reference capacitor ($C_R$), characterized in that a control pressure measuring value (p') is obtained with an auxiliary capacitor ($C_Z$) arranged outside the pressure measuring cell (10) and the operability of the pressure measuring cell (10) is inferred by comparing the pressure measuring value (p) to the control pressure measuring value (p') is provided.

14 Claims, 6 Drawing Sheets

(51) Int. Cl.
　　　*G01L 9/12*　　　(2006.01)
　　　*G01L 27/00*　　(2006.01)

(56) References Cited

U.S. PATENT DOCUMENTS

| | | | |
|---|---|---|---|
| 5,663,506 A * | 9/1997 | Moore et al. | 73/708 |
| 5,969,258 A * | 10/1999 | Gerst et al. | 73/718 |
| 5,992,240 A | 11/1999 | Tsuruoka et al. | |
| 6,892,582 B1 * | 5/2005 | Satou et al. | 73/715 |
| 7,845,224 B2 * | 12/2010 | Barlesi et al. | 73/304 C |
| 8,281,655 B2 * | 10/2012 | Bahorich et al. | 73/304 C |
| 8,371,180 B2 * | 2/2013 | Doering et al. | 73/862.68 |
| 2008/0301211 A1 | 12/2008 | Tilton | |
| 2009/0301211 A1 | 12/2009 | Yoshikawa | |
| 2010/0125425 A1 * | 5/2010 | Jacob et al. | 702/50 |

FOREIGN PATENT DOCUMENTS

| | | |
|---|---|---|
| DE | 19851506 C1 | 10/2000 |
| DE | 102009002662 A1 | 10/2010 |
| EP | 0569573 B1 * | 11/1992 |
| WO | 9311415 A1 | 6/1993 |

\* cited by examiner

METHOD FOR SELF-MONITORING A CERAMIC PRESSURE MEASURING CELL OF A CAPACITIVE PRESSURE SENSOR AND EVALUATION CIRCUIT FOR CARRYING OUT SAID METHOD

FIELD OF TECHNOLOGY

The invention relates to a method for self-monitoring a ceramic pressure measuring cell of a capacitive pressure sensor as well as an evaluation circuit for carrying out the method pursuant to the preamble of claims 1 and 2 or claim 9.

BACKGROUND

Capacitive pressure sensors are used to measure pressure in many industrial sectors. They frequently feature a ceramic pressure measuring cell as transducer for the processing pressure and evaluation electronics for signal processing.

Capacitive pressure measuring cells consist of basic ceramic elements and a membrane, with a solder glass ring is arranged between the basic element and the membrane. The hollow space between the basic element and the membrane obtained in this way makes possible the longitudinally directed mobility of the membrane as a result of the influence of a pressure. Electrodes, which together form a measuring capacitor, are respectively provided on the underside of the membrane and on the opposite upper side of the basic element. A deformation of the membrane, which has as a consequence a change in the capacity of the measuring capacitor, occurs under the effect of pressure.

The capacity change is registered with the aid of an evaluation unit and converted into a pressure measuring value. These pressure sensors serve as a rule for monitoring or controlling processes. They are therefore frequently connected to higher ranking control units (SPS).

From DE 198 51 506 C1 is known a capacitive pressure sensor, in which the pressure measuring value is determined from the quotient of two capacity values, a measuring capacitor and a reference capacitor. A pressure measuring cell is however not particularly described in this patent publication, but the depicted circuit and the described method are suitable for capacitive pressure measuring cells.

From EP 0 569 573 B1 is known a circuit arrangement for a capacitive pressure sensor, in which a quotient method is likewise used for pressure evaluation.

Quotient methods are based, as a rule, on the following pressure dependencies:

$$p \sim \frac{C_R}{C_M} \text{ or } p \sim \frac{C_R}{C_M} - 1 \text{ or } p \sim \frac{C_M - C_R}{C_M + C_R},$$

wherein $C_M$ identifies the capacity of the measuring capacitor, $C_R$ identifies the capacity of the reference capacitor, and p identifies the processing pressure to be determined. The possibility of exchanging $C_M$ and $C_R$ in the quotient is also conceivable. The disclosed example with $C_M$ in the denominator represents, however, the most common form for the benefit of the self-linearization. This embodiment will be assumed in the following, unless otherwise indicated.

The reliability of capacitive sensors is gaining increasingly in importance. One problem of capacitive pressure sensors operating according to the quotient method is that a medium ingress—caused by membrane rupture or made possible by an eventual venting channel—could not be detected as a result of the quotient formation, because the dielectric constant $\epsilon_r$ correspondingly changes in the numerator as well as the denominator. This problem is further aggravated if the $\epsilon_r$ of the incoming medium differs only to a minor extent from the $\epsilon_r$ of air. This is especially the case when the medium to be measured is oil. The $\epsilon_r$ of oil is typically between 2 and 4, while the $\epsilon_r$ of air is 1.

SUMMARY

It is an object of the invention to disclose a method for monitoring the operation of a pressure measuring cell of a capacitive pressure sensor and a corresponding evaluation circuit, which do not have the above-mentioned disadvantages and allow in particular a secure and reliable detection of a medium ingress, potentially, for instance, by means of an ventilation channel or in the case of a membrane rupture.

This object is attained by means of the features disclosed in claims 1 and 2 or claim 6. Advantageous further developments of the invention are disclosed in the respective dependent claims.

The method for self-monitoring a pressure measuring cell of a capacitive pressure sensor according to the invention is characterized in a first alternative in that a control pressure measuring value is obtained with an auxiliary capacitor, which is arranged outside of the pressure measuring cell, and the operability of the pressure measuring cell can be inferred by comparing the actual pressure measuring value to the control pressure measuring value.

The fundamental idea of the invention consists in determining the control pressure measuring value, which is compared to the actual pressure measuring value, with a capacitive pressure sensor having a ceramic pressure measuring cell with the aid of an auxiliary capacitor $C_Z$, whose capacity is independent from the membrane pressure. A condition for this is that the capacity of the measuring capacitor as well as also that of the reference capacitor can be proportionally changed as a result of the pressure influence, while the capacity of the auxiliary capacitor remains constant, since it is independent from the applied pressure.

The comparison of the actual pressure measuring value to the control pressure measuring value is advantageously carried out via the difference formation of both measured values. A quotient formation is also conceivable in principle, but the calculated danger of a division by zero could occur, for example, with zero pressure.

In another advantageous further development of the invention, the pressure measuring value and/or the control pressure measuring value can be obtained with the aid of a quotient method. The denominator required for the second quotient for the control measuring value is advantageously the same as the first one for the actual pressure value.

It is alternatively also conceivable to calculate the pressure value and control pressure measuring value via a difference formation. The dielectric would have to be determined in this case—for example, via a climate sensor—in order to compensate for fluctuations of the capacities due to changes of the dielectric conductivity or permittivity. This would, on the other hand, not be necessary with the quotient method, because the dielectric constant changes to the same extent in both the numerator and the denominator.

If then the two quotients $C_R/C_M$ and $C_Z/C_M$ are compared to each other and the measuring cell is intact, this different fluctuates within a defined range. As soon as the measuring cell is defective, for example, due to a membrane rupture, the two quotients clearly differ from each other in such a way that a distinct defect or malfunction must be assumed.

The calibration of the capacitive pressure sensor is advantageously carried out in such a way that the control pressure measuring value and the actual pressure measuring value show the same functional dependency on the processing pressure, and a diagnosis value can be determined with it by simply comparing both measuring values, for example, with the aid of a differential.

Aside from the similar previously described embodiment, the cited objective can also be attained by means of digital processing, in that the method for self-monitoring a pressure measuring cello of a capacitive pressure sensor is characterized, in a second alternative, in that a processing unit consisting of at least one converter unit and a microcontroller is provided, in which the capacity values of the measuring capacitor as well as those of the reference capacitor are registered, the pressure measuring value is formed from the two capacity values, and another capacity value is registered, which corresponds to an auxiliary capacitor, and from which a control pressure measuring value is obtained, wherein the operability of the pressure measuring cell can be inferred by comparing the pressure measuring value to the control pressure measuring value.

In contrast to the first alternative of the method, the capacity values of the measuring and reference capacitors are registered by a converter unit and forwarded to the microcontroller, where both the quotient calculation and the comparison of the pressure measuring value and the control pressure measuring value are carried out. The auxiliary capacitor can at the same time be available either as an element or component, whose capacity value is likewise registered by the converter unit and forwarded to the microcontroller, or carried out in the form of a capacity value stored in the processing unit, in particular in the microcontroller.

In another aspect, the invention relates to an evaluation circuit for an above-mentioned capacitive sensor having a measuring capacitor and a reference capacitor, wherein the reference capacitor is provided in a differentiating branch and the measuring capacitor is provided in an integrating branch, both branches being connected in parallel and a voltage signal being applied to them, wherein the output signal of the integrating branch is fed to the differentiating branch, at whose output a first pressure-dependent output signal is applied. According to the invention, a control measuring branch is connected to an auxiliary capacitor in parallel to the differentiating branch and the output signal of the integrating branch is fed in addition to the control measuring branch, at whose output a second pressure-dependent output signal is applied. Both output signals are then fed to a comparator unit, at whose output a diagnosis signal is emitted.

The two pressure-dependent output signals from the differentiating and control measuring branch can be fed both directly and indirectly to the comparator unit, for example, in the latter case, via a sample and hold circuit, which converts the square wave voltage into direct current voltage.

BRIEF DESCRIPTION

The invention will be described in more detail below with reference to exemplary embodiments in connection with the figures.

DETAILED DESCRIPTION

Figure 1:
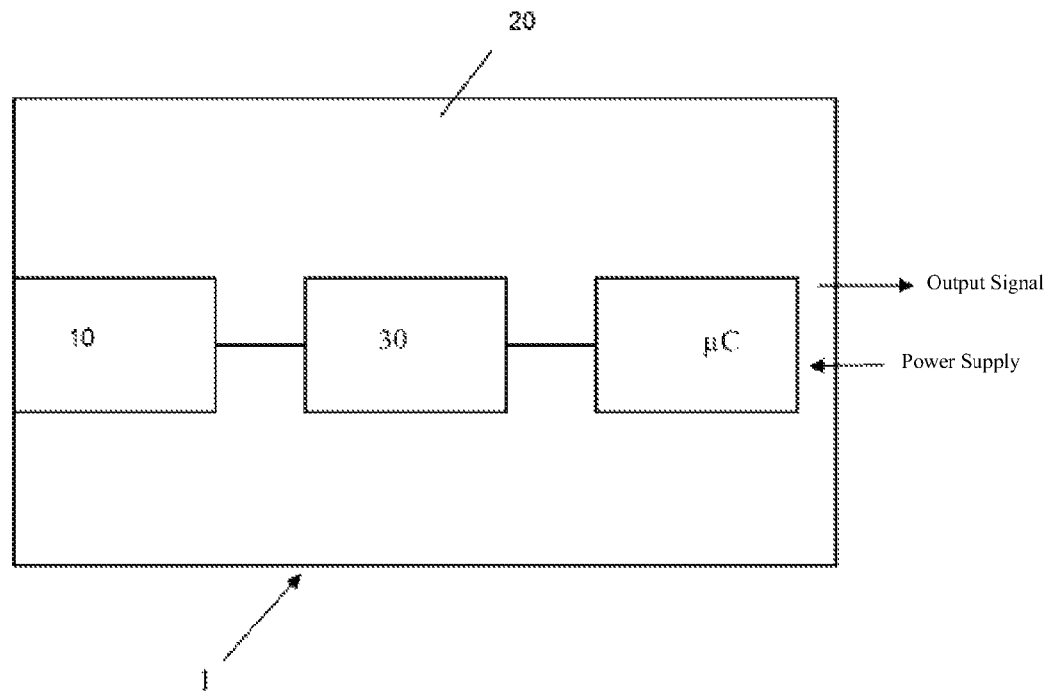
FIG. 1 shows a block circuit diagram of a capacitive pressure sensor.

In FIG. 1 shows a block circuit diagram of a typical capacitive pressure sensor, which is used for measuring a processing pressure p (for example, of oil, milk, water, et cetera). The pressure sensor 1 consists essentially of a pressure measuring cell 10 and evaluation electronics 20. The evaluation electronics 20 has an analog evaluation circuit 30 and a microcontroller μC, in which the analog output signal of the evaluation circuit 20 is digitalized and further processed. The microcontroller μC provides the evaluation result as a digital or analog output signal, for example, of an SPS. The pressure sensor 1 is connected to a voltage supply line (12-36 V) for power supply.

Figure 2:
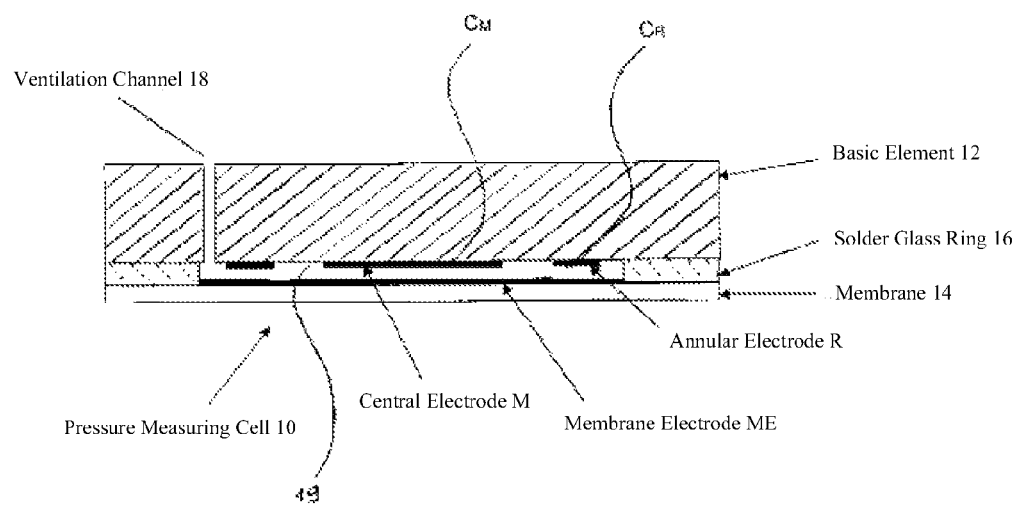
FIG. 2 shows a schematic sectional view of a capacitive pressure measuring cell.

FIG. 2 shows a schematic representation of a typical capacitive pressure measuring cell 10, as frequently used in capacitive pressure sensors. The pressure measuring cell 10 consists essentially of a basic element 12 and a membrane 14, which are connected to each other via a solder glass ring 16. The basic element 12 and the membrane 14 delimit a hollow space 19, which is connected—preferably only within low pressure ranges of up to 50 bar—via a ventilation channel 18 to the rear side of the pressure measuring cell 10.

Several electrodes, which form a reference capacitor $C_R$ and a measuring capacitor $C_M$, are provided on the basic element 12 as well as also on the membrane 14. The measuring capacitor $C_M$ is formed by the membrane electrode ME and the central electrode M; the reference capacitor $C_R$ is formed by the annular electrode R and the membrane electrode ME.

The processing pressure p acts on the membrane 14, which is deflected to a greater or lesser degree according to the pressure application, whereupon the distance of the membrane electrode ME to the central electrode M fundamentally changes. This leads to a corresponding capacity change of the measuring capacitor $C_M$. The influence on the reference capacitor $C_R$ is less strong, since the distance between the annular electrode R and the membrane electrode ME changes considerably less than the distance between the membrane electrode ME and the central electrode M.

No distinction is made in the following between the designation of the capacitor and its capacity value. $C_M$ therefore designates both the measuring capacitor per se and its capacity.

Figure 3:
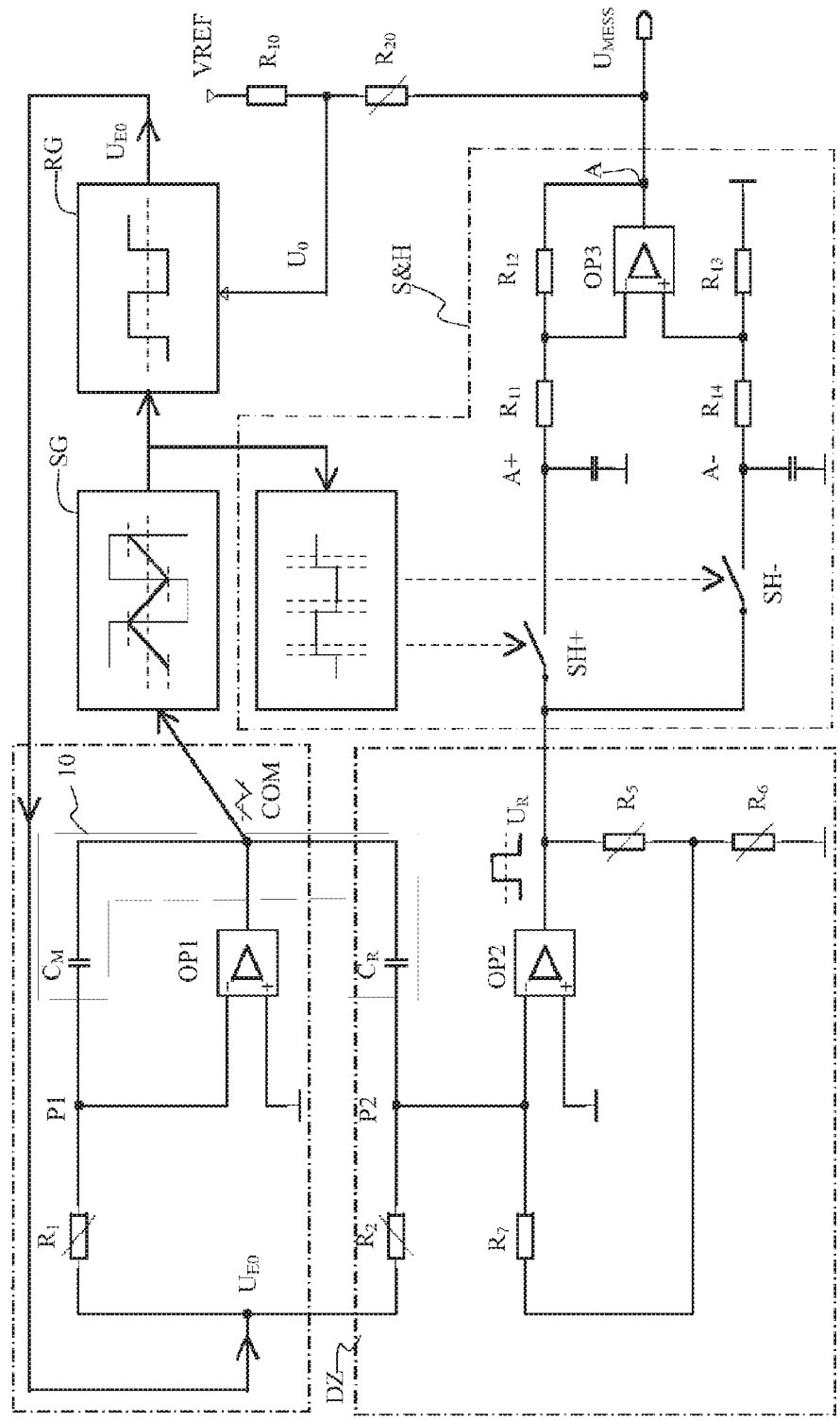
FIG. 3 shows an evaluation circuit for a capacitive pressure measuring cell according to FIG. 2.

FIG. 3 shows in more detail a known evaluation circuit 30 for the pressure measuring cell 10. The measuring capacitor $C_M$ is arranged together with a resistor $R_1$ in an integrating branch IZ, and the reference capacitor $C_R$ is arranged together with a resistor $R_2$ in a differentiating branch DZ. A square wave voltage $U_{E0}$, which preferably varies symmetrically around 0 Volt, is applied at the input of the integrating branch IZ. The input voltage $U_{E0}$ is converted into a linearly ascending or descending voltage signal (depending on the polarity of the input voltage), which is outputted at the output COM of the integrating branch IZ via the resistor $R_1$ and the measuring capacitor $C_M$ with the aid of an operational amplifier OP1, which functions as an integrator. The measuring point P1 is virtually connected to ground at the same time through the operational amplifier OP1.

The output COM is connected to a threshold value comparator SG, which activates a square wave generator RG. As soon as the voltage signal at the output COM exceeds or drops below a threshold value, the comparator SG changes its output signal, whereupon the square wave generator respectively inverts its output voltage.

The differentiating branch DZ consists further of an operational amplifier OP2, a voltage divider having the two resistors $R_5$ and $R_6$, and a feedback resistor $R_7$. The output of the operational amplifier OP2 is connected to a sample and hold circuit S&H. The measuring voltage $U_{Mess}$, which is proportional to the processing pressure p acting on the pressure measuring cell 10, is applied at the output of the sample and hold circuit S&H.

The function of this measuring circuit will be described in more detail below. The operational amplifier OP1 ensures that the connecting point P1 between the resistor $R_1$ and the measuring capacitor $C_M$ is kept connected virtually to ground. In this way a constant current $I_1$ flows via the resistor $R_1$, which charges the measuring capacitor $C_M$ until the square wave voltage $U_{E0}$ changes its sign.

It can be seen in FIG. 3 that in the case $R_1=R_2$ and $C_M=C_R$, the measuring point P2 in the differentiating branch DZ is at the same potential as the measuring point P1, that is, at ground level, even if the connection between the measuring point P2 and the operational amplifier OP2 is not present. This applies not only in this special case, but always when the time constants $R_1*C_M$ and $R_2*C_R$ are mutually identical. With zero balance, this state is correspondingly adjusted via the variable resistors $R_1$ or $R_2$. If the capacity of the measuring capacitor $C_M$ changes as a result of the pressure effect, the condition of equality of the time constants in the integrating branch IZ and in the differentiating branch DZ is no longer provided and the potential at the measuring point P2 will deviate from the value zero. This change is directly counteracted, however, by the operational amplifier OP2, since the operational amplifier OP2 continues to keep the connecting point P2 virtually connected to ground. A square wave voltage $U_R$, whose amplitude depends on the two time constants, is therefore applied at the output of the operational amplifier OP2. It can be easily shown that the pulse height is directly proportional to the processing pressure p~$C_R/C_M$−1, wherein the dependency is fundamentally linear. The pulse height of this voltage pulse can be adjusted via the voltage divider, which is formed by the two resistors $R_5$ and $R_6$.

The positive and negative pulse height A+ or A− of the square wave pulse is determined via the sample and hold circuit S&H, and the amount A is emitted as measuring voltage $U_{Mess}$ at the output of the operational amplifier OP3 and forwarded to the microcontroller mC (not shown). It could, however, also be directly emitted as an analog value. The pulse height of the input voltage $U_{E0}$, which is applied at the output of the square wave generator RG, is adjusted in dependence upon the measuring voltage $U_{Mess}$ in order to achieve a better linearity. A voltage divider consisting of the resistors $R_{20}$ and $R_{10}$ is provided for this purpose. This voltage divider is connected to and can be advantageously adjusted with a reference voltage VREF.

Figure 4:
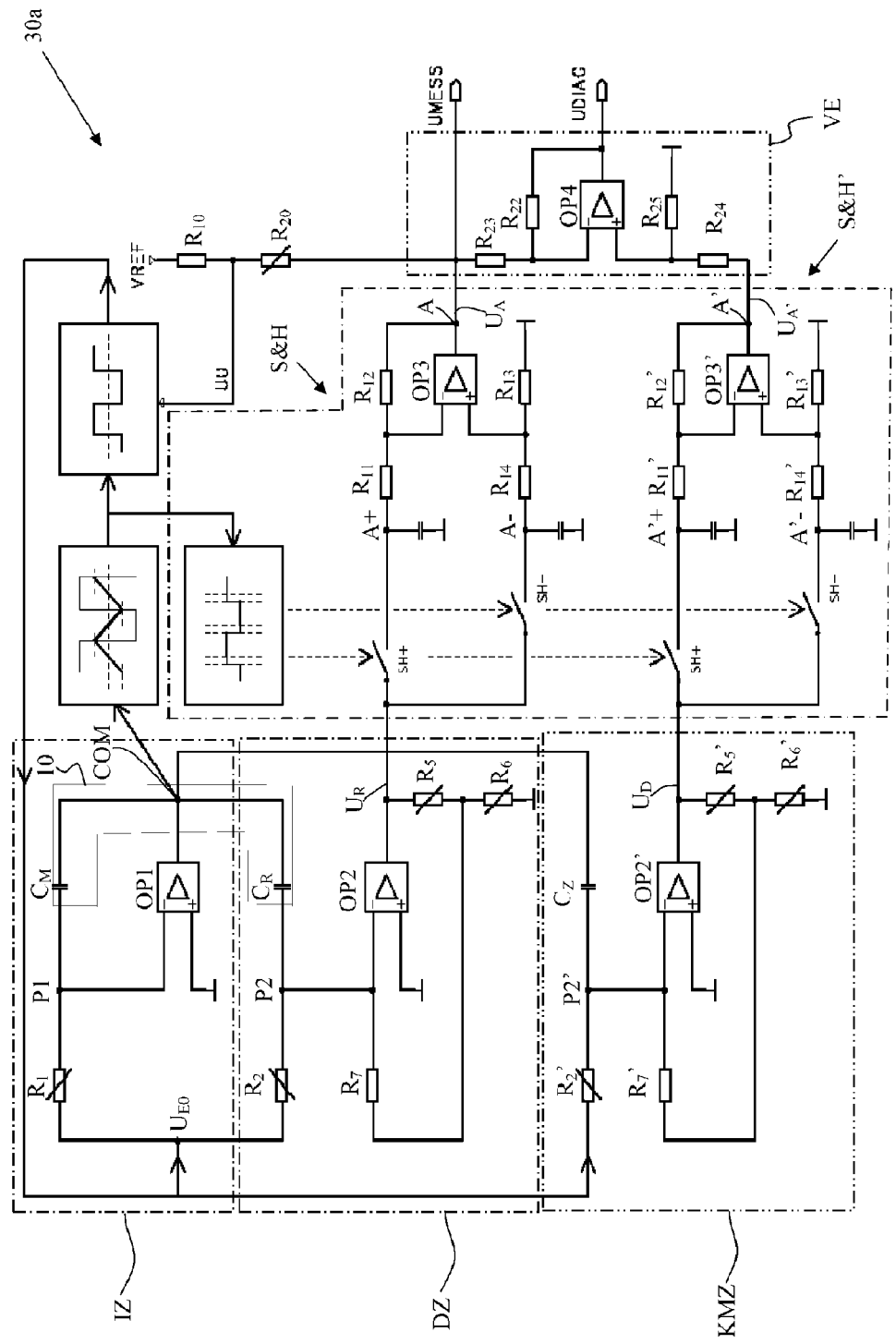
FIG. 4 shows an evaluation circuit according to the invention for a capacitive pressure measuring cell according to claim 2.

FIG. 4 depicts the evaluation circuit 30a according to the invention. This circuit corresponds to the circuit according to FIG. 3, but with an additional control measuring branch KMZ and a comparator unit VE.

The control measuring branch KMZ comprises a resistor $R_2'$ and an auxiliary capacitor $C_Z$, which are arranged parallel to the resistor $R_1$ and the measuring capacitor $C_M$. An operational amplifier OP2', which functions as differentiator like the operational amplifier OP2, is connected to the measuring point P2'. A square wave voltage Up that is proportional to the term $C_Z/C_M$−1 is applied at the output of the operational amplifier OP2'. This square wave voltage is likewise rectified with a sample and hold circuit S&H' (voltage $U_{A'}$ at the point A') and subsequently compared to the measuring voltage $U_{Mess}$ in a comparator unit VE with the aid of a differential amplifier OP4. The functional sequence of the square wave voltage $U_D$—or the voltage $U_{A'}$ at A'—can be dimensioned via the adjustable resistors $R_{5'}$ and $R_{6'}$ in dependence upon the processing pressure p according to the progression of the measuring voltage $U_{Mess}$. The diagnosis voltage $U_{DIAG}$ is applied at the output of the differential amplifier OP4.

Normally, both voltages $U_N$ and $U_{Mess}$ for each processing pressure p are almost identical—a tolerance range resulting, for example, from temperature influences, should be allowed—and the output voltage $U_{DIAG}$ is zero.

The diagnosis voltage $U_{DIAG}$ essentially follows the term $$U_{DIAG} = U_0 * \left[k1 * \left(\frac{k2*C_R}{C_M} - 1\right) - k3 * \left(\frac{k4*C_Z}{C_M} - 1\right)\right],$$

wherein the following applies:
k1=amplification factor, measuring branch
k2=zero balancing factor, measuring branch
k3=amplification factor, control measuring branch
k4=zero balancing factor, control measuring branch The correction factors k1 to k4 are advantageously realized by means of balanceable resistor networks; their placement in the represented formula is intended only as an example and can of course be changed depending on the intended proportionality direction.

A medium ingress or membrane rupture has an effect only on the capacity values of the two capacitors $C_R$ and $C_M$, or only on the capacity value of one of these two capacitors, but it does not have an effect on $C_Z$, so that in this case the voltage $U_{DIAG}$ deviates noticeably from zero. This deviation can be registered by a microcontroller (not shown), and a corresponding reaction can be initiated. The latter could consist, for example, of an alarm message, which is forwarded to the SPS or to an on-site signaling means.

Figure 5:
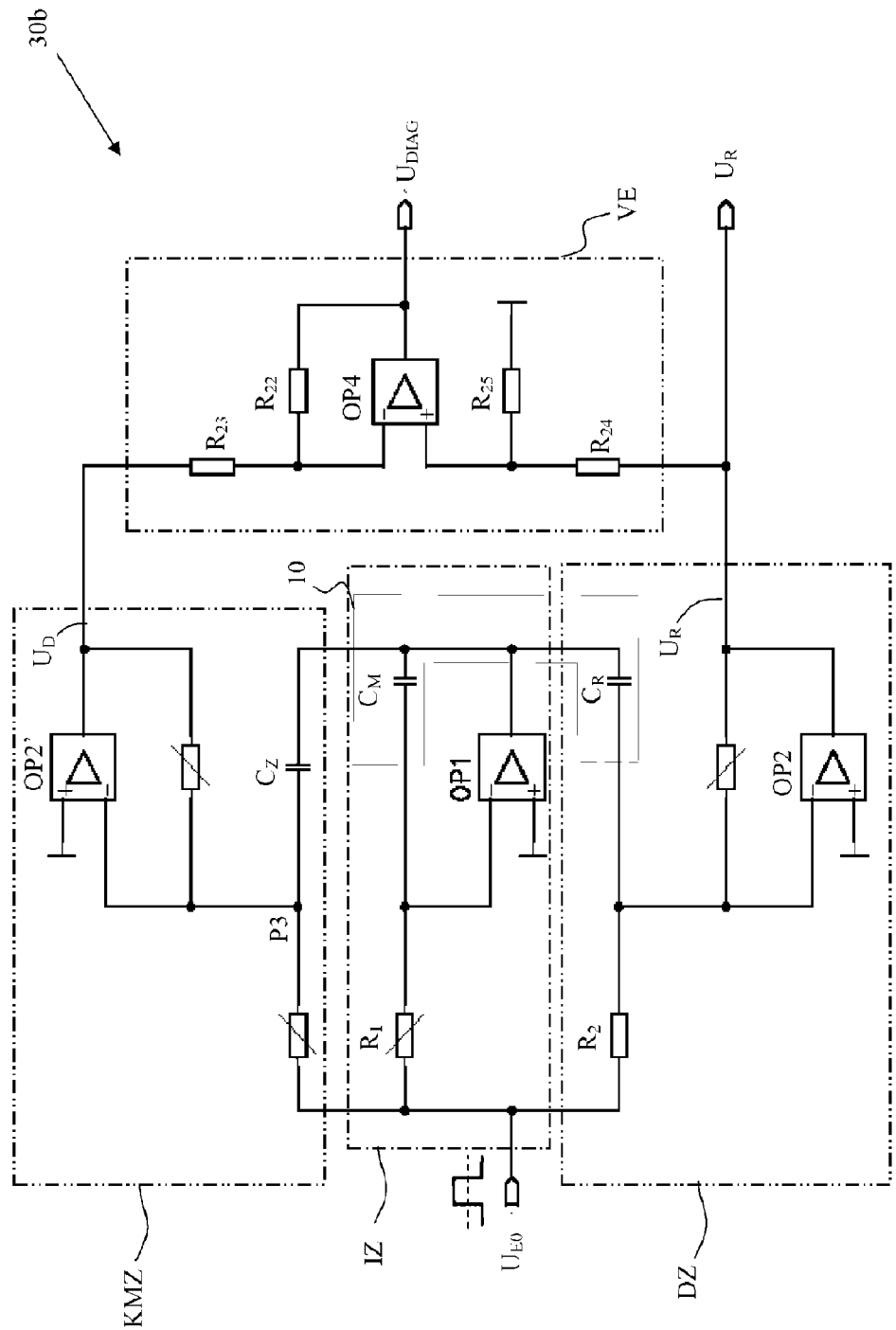
FIG. 5 shows an evaluation circuit according to the invention for a capacitive pressure measuring cell according to FIG. 2 without sample and hold circuits.

FIG. 5 shows a somewhat modified circuit 30b, which functions without a sample and hold element. The advantage with respect to the embodiment in FIG. 4 is that the circuit complexity is reduced and the production costs can be reduced as a result. Interpretation is admittedly made more difficult by the square-wave diagnosis signal. The represented resistors are only symbolic in FIG. 5 and can also respectively comprise a resistor network. The measuring voltage $U_R$ is a square-wave voltage, as in the previously described embodiments. The diagnosis signal $U_{DIAG}$ is therefore emitted as a square wave in this case. Both circuits 30a, 30b are suitable for both analog and digital further processing with a microcontroller.

The inventive method will be described in more detail in the following.

As already disclosed in the previous exemplary embodiments, the pressure measuring cell 10 of the capacitive pressure sensor 1 has a measuring capacitor $C_M$ and a reference capacitor $C_R$. The pressure measuring value p, for example, the voltage $U_R$, is advantageously obtained via a quotient method from the capacity values of the measuring capacitor $C_M$ and the reference capacitor $C_R$. A control pressure measuring value p', for example the voltage $U_D$, is likewise obtained according to the invention via a quotient method with the aid of an auxiliary capacitor $C_Z$. Since the auxiliary capacitor $C_Z$ is arranged in such a way that it remains fully uninfluenced by a membrane rupture of the membrane 14 or a medium ingress into the pressure measuring cell 10, the two measuring values change differently in each case.

The operability of the pressure measuring cell can thus be inferred by means of the comparison of these two measuring values. The operability of the pressure measuring cell is ensured as long as both measuring values change uniformly with the processing pressure.

The control pressure measuring value p' can be determined with the measuring capacitor $C_M$ as well as with the reference capacitor $C_R$.

The calibration of the capacitive pressure sensors is carried out in such a way, for a simple evaluation, that the control pressure measuring value p' and the pressure measuring value p have the same functional dependency on the processing pressure. It is self-evident that parts of the evaluation circuit 30a can also be digitally realized in a microcontroller. The invention allows, without great effort, the expansion of an existing capacitive pressure sensor by one diagnosis function.

The inventive method and the corresponding evaluation circuit are suitable not only for the detection of a medium ingress in the case of a membrane rupture, but also for diagnosis of crack formations in the membrane 14, because the flexural strength of the membrane 14 changes at the same time, and this has a different effect on the measuring value p' determined via the reference capacitor $C_R$ and the pressure measuring value p determined via the measuring capacitor $C_M$.

Figure 6:
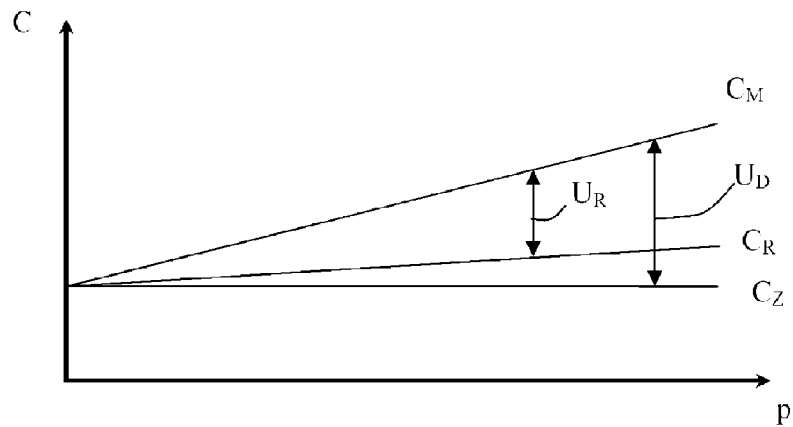
FIG. 6 shows a diagram that depicts in simplified form the behavior of the three capacity values $C_M$, $C_R$ and $C_Z$ under the pressure.

FIG. 6 depicts in simplified form how the three capacity values $C_M$, $C_R$, $C_Z$ behave in relation to pressure. The curve of the measuring capacitor $C_M$ has the greatest ascending slope, because it is located in the center of the membrane 14 of the pressure measuring cell 10, and consequently the membrane 14 has here the greatest deflection under the influence of pressure. The reference capacitor $C_R$ is located at the edge of the membrane 14, where the change in distance between the two electrodes R, ME is smaller. The capacity increase per pressure unit is therefore smaller than with the measuring capacitor $C_M$. And finally, it can be seen that the capacity of the auxiliary capacitor $C_Z$ does not change, remaining constant over the entire pressure curve. This is the fundamental condition of the invention. The arrow between $C_M$ and $C_R$ clarifies the amount-related progression of the output voltage $U_D$ of the control measuring branch KMZ.

Figure 7:
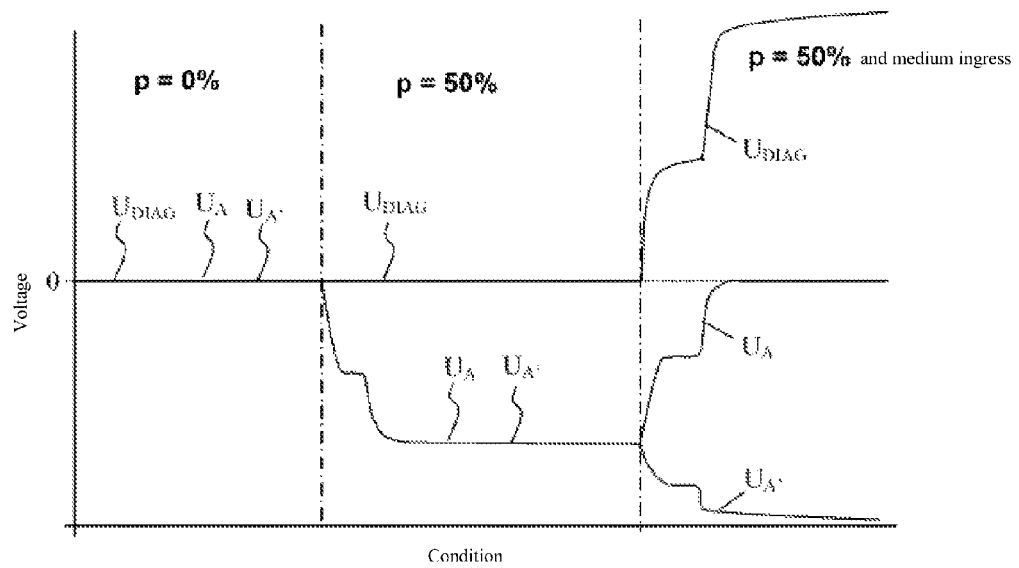
FIG. 7 shows a diagram that depicts in simplified form the behavior of the diagnosis voltage $U_{DIAG}$ in the three conditions: no pressure, pressure influence, and cell defect through medium ingress.

FIG. 7 shows a diagram depicting in simplified form the behavior of the diagnosis voltage $U_{DIAG}$ under the three conditions: no pressure, pressure influence, and cell defect through medium ingress. Shown in simplified form, this is an elementary circuit diagram: actual signal characteristics can be represented slightly differently, in particular in relation to the amount. Other differences, such as resistive defects or the like, are also not taken into consideration. The basic signal characteristic, however, simulates that of an actual measurement. The signals $U_A$ and $U_{A'}$ at the points A or A' are output signals $U_R$ and $U_D$ of the differential branch DZ, and the control measuring branch KMZ is converted to direct current voltage by means of the sample and hold circuit. The voltage $U_{DIAG}$ is the diagnosis voltage as a difference between the two signals $U_A$ and $U_{A'}$. The diagram thus illustrates the mode of operation of the comparator unit VE.

No pressure is applied on the membrane 14 in the first third of the diagram. For this reason, the two signals $U_A$ and $U_{A'}$ as well as the diagnosis voltage $U_{DIAG}$ display the value zero.

In the second third of the diagram, as an example, a pressure load on the membrane 14 of 50% is assumed. Because the signal direction is negative with increasing pressure, the two signals $U_A$ and $U_{A'}$ move congruently below the 0V line as a result of the previous adjustment. The diagnosis voltage $U_{DIAG}$ as the difference between the two signals $U_A$ and $U_{A'}$ remains zero. The step-like signal sequences of A and A' are caused by the alternating and consequently time-delayed actualization of the sample and hold capacitors at A+ and A−, whose sums of the charging voltages only represent the pressure value when added together.

In the last third of the diagram the signal sequences during medium ingress are represented, again with an assumed 50% pressure load. Since the medium to be measured is now located inside the cell, that is in the hollow element 19 formed by the basic element 12 and the membrane 14, the existing pressure is equal to the pressure outside the membrane 14, and the now increased permittivity has an effect on the sum of the quotients. The signal $U_A$, as a measurement of the actual measuring voltage $U_{Mess}$, consequently moves in the direction of 0 Volt. A step-shaped signal sequence is again obtained by means of the sample and hold circuit S&H. The signal $U_{A'}$, on the other hand, continues to move in a negative direction as a result of the continued constant capacity $C_Z$, which is present in the enumerator of the quotient for the calculation of $U_{A'}$, and the capacity $C_M$, which becomes greater on one side as a result of the increasing permittivity and which is present in the denominator of the quotient for the calculation of $U_{A'}$. The diagnosis voltage $U_{DIAG}$, as difference between the two signals $U_A$ and $U_{A'}$, now clearly moves in positive direction. At least—and this is what is decisive—the diagnosis voltage $U_{DIAG}$ is unequal to zero, which is recognized as a measurement of a cell defect and can be further processed.

Figure 8:
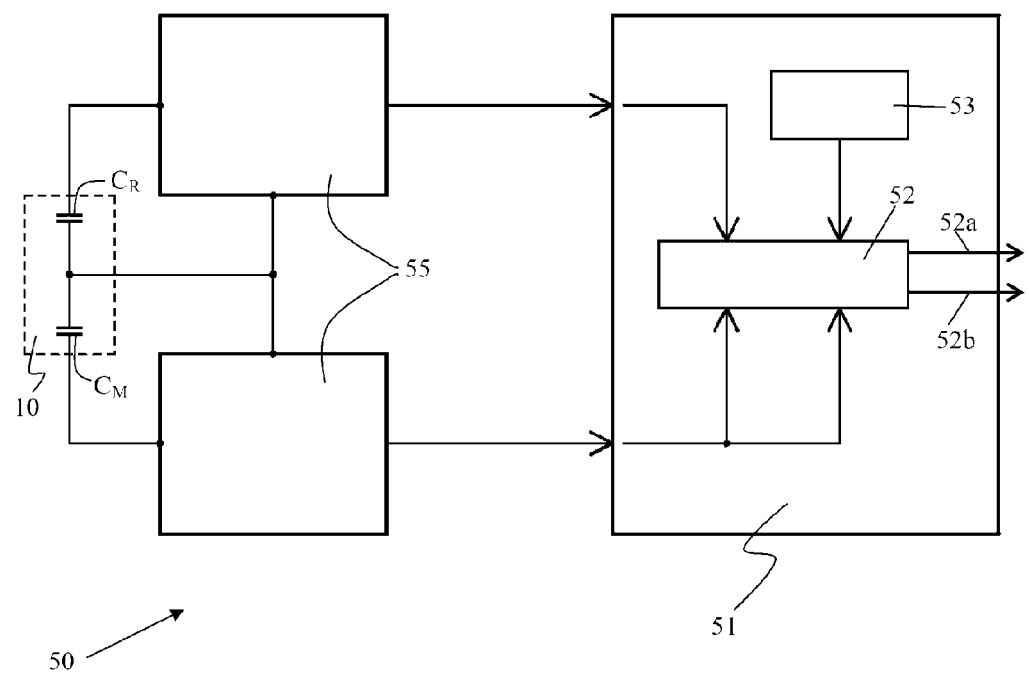
FIG. 8 shows an embodiment of the method according to the invention as an alternative to FIGS. 3-5.

In FIG. 8 is represented an embodiment of the method according to the invention as an alternative to the embodiment shown in FIGS. 4 and 5. The pressure measuring cell 10 is here identical to the previously described exemplary embodiments. The capacity changes of $C_M$ and $C_R$ resulting from the pressure influence are, however, not subjected to an analog, but rather a digital evaluation in a processing unit 50 consisting of at least one converter unit 55 and a microcontroller 51. For this purpose, it is initially necessary to register and digitalize the capacity values of $C_M$ and $C_R$. A converter unit 55, which can be configured as AD7745 circuit "capacitance to digital converter," is provided for this purpose. A converter unit is provided for both capacitors $C_M$ and $C_R$ in FIG. 8. However, there are also multichannel converter units, so that several capacities can be registered and digitalized with one converter unit. The digitalized capacity values of $C_M$ and $C_R$ are then fed to a microcontroller, in whose processor unit 52 the quotient terms $C_R/C_M-1$ and $C_Z/C_M-1$ are mutually compared in the previously described manner by means of difference formation. The value for $C_Z$ comes then comes, as already shown in FIG. 8, either from a memory unit 53, which is preferably located within the microcontroller 51 and in which a capacity value representing an auxiliary capacitor $C_Z$ is stored, or alternatively from a capacitor configured as an element or component arranged outside the processing unit 50, whose capacity is likewise registered by a converter unit 55 and fed in digitalized form to the microcontroller 51. In both cases it must however be ensured that the capacity $C_Z$ remains completely uninfluenced by a membrane rupture of the membrane 14 or a medium ingress into the pressure measuring cell 10. The result of this comparison, that is, whether a case of malfunction is present or not, is then forwarded for further processing as diagnosis value 52a, in addition to the actual measuring value 52b.

The invention claimed is:

1. A method comprising:
monitoring an operation of a pressure measuring cell of a capacitive pressure sensor, wherein a pressure measuring cell has a measuring capacitor and a reference capacitor and the pressure measuring value is obtained from the capacity values of the measuring capacitor ($C_M$) and the reference capacitor;
wherein a control pressure measuring value is obtained with an auxiliary capacitor arranged outside the pressure measuring cell and the operability of the pressure measuring cell is inferred by comparing the pressure measuring value to the control pressure measuring value.

2. A method comprising:
monitoring an operation of a pressure measuring cell of a capacitive pressure sensor, wherein the pressure measuring cell has a measuring capacitor and a reference capacitor and a pressure measuring value is obtained from the capacity values of the measuring capacitor and the reference capacitor;
wherein a processing unit comprising at least one converter unit and a microcontroller is provided, in which the capacity values of the measuring capacitor as well as the reference capacitor are registered, the pressure measuring value is formed from the two capacity values, and another capacity value is registered, which corresponds to an auxiliary capacitor and from which a control pressure measuring value is obtained, wherein the operability of the pressure measuring cell is inferred by comparing the pressure measuring value to the control pressure measuring value.

3. The method of claim 2, wherein the auxiliary capacitor is configured as an element outside the pressure measuring cell, whose capacity value is registered by the processing unit.

4. The method of claim 2, wherein the auxiliary capacitor is configured in the form of a capacity value stored in the processing unit, in particular in the microcontroller.

5. The method of claim 1, wherein the pressure measuring value and/or the control pressure measuring value is obtained with the aid of a quotient method.

6. The method of claim 1, wherein the control pressure measuring value is obtained from the capacity values of the measuring capacitor and the auxiliary capacitor.

7. The method of claim 1, wherein the control pressure measuring value is obtained from the capacity values of the reference capacitor and the auxiliary capacitor.

8. The method of claim 1, wherein the capacitive pressure sensor is calibrated in such a way that the control pressure measuring value and the pressure measuring value have the same functional dependence on the processing pressure and a case of malfunction is present if the difference between the pressure measuring value and the control pressure measuring value exceeds a predetermined limit value.

9. An evaluation circuit for a capacitive sensor comprising:
a measuring capacitor and a reference capacitor, wherein the reference capacitor is provided in a differential branch and the measuring capacitor is provided in an integrating branch, which are connected in parallel and on which a voltage signal is applied, wherein the output signal of the integrating branch is fed to the differential branch, at whose output a first pressure-dependent output signal is applied;
wherein a control measuring branch is connected to an auxiliary capacitor in parallel with the differential branch and the output signal of the integrating branch is additionally fed to the control measuring branch, at whose output a second pressure-dependent output signal is applied, and both output signals are fed to a comparator unit, at whose output a diagnosis signal is emitted.

10. The evaluation circuit of claim 9, wherein the auxiliary capacitor is arranged outside the pressure measuring cell.

11. The evaluation circuit of claim 9, wherein the capacitive sensor is a pressure sensor.

12. The method of claim 1, wherein the capacity of the auxiliary capacitor is independent from a pressure of a membrane of the pressure measuring cell.

13. The method of claim 2, wherein the capacity of the auxiliary capacitor is independent from a pressure of a membrane of the pressure measuring cell.

14. The evaluation circuit of claim 9, wherein the capacity of the auxiliary capacitor is independent from a pressure of a membrane of the pressure measuring cell.

* * * * *